(12) United States Patent
Bhardwaj et al.

(10) Patent No.: US 11,876,167 B2
(45) Date of Patent: Jan. 16, 2024

(54) MULTIPLE BATTERY CONFIGURATIONS FOR SPACE UTILIZATION

(71) Applicant: GOOGLE LLC, Mountain View, CA (US)

(72) Inventors: Ramesh C. Bhardwaj, Fremont, CA (US); Taisup Hwang, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/295,628

(22) PCT Filed: Jun. 12, 2019

(86) PCT No.: PCT/US2019/036816
§ 371 (c)(1),
(2) Date: May 20, 2021

(87) PCT Pub. No.: WO2020/251572
PCT Pub. Date: Dec. 17, 2020

(65) Prior Publication Data
US 2022/0102748 A1 Mar. 31, 2022

(51) Int. Cl.
H01M 50/247 (2021.01)
H01M 10/04 (2006.01)
(Continued)

(52) U.S. Cl.
CPC ........ *H01M 10/0445* (2013.01); *G06F 1/263* (2013.01); *H01M 6/02* (2013.01);
(Continued)

(58) Field of Classification Search
CPC ......... H01M 10/0445; H01M 10/0436; H01M 50/247; H01M 50/105; H01M 50/211;
(Continued)

(56) References Cited

U.S. PATENT DOCUMENTS

| 5,783,327 A | * | 7/1998 | Mendolia | H01M 50/247 |
| | | | | 429/97 |
| 2009/0136839 A1 | * | 5/2009 | Kraznov | H01M 6/188 |
| | | | | 429/160 |

(Continued)

FOREIGN PATENT DOCUMENTS

| CN | 101504977 A | 8/2009 |
| WO | 2014051881 A1 | 4/2014 |

OTHER PUBLICATIONS

PCT International Search Report and Written Opinion, Application No. PCT/US2019/036816, dated Oct. 7, 2019, 10 pages.

*Primary Examiner* — Jane J Rhee
(74) *Attorney, Agent, or Firm* — McDonnell Boehnen Hulbert & Berghoff LLP

(57) ABSTRACT

Example embodiments relate to multiple battery configurations for space utilization. One embodiment includes a device. The device includes a primary battery. The device also includes an auxiliary battery configured to supply auxiliary electrical power. A first surface of the auxiliary battery is positioned along a first surface of the primary battery. The auxiliary battery is a thin-film battery. The first surface of the auxiliary battery has a smaller area than the first surface of the primary battery.

20 Claims, 16 Drawing Sheets

(51) Int. Cl.
*H01M 50/105* (2021.01)
*H01M 50/512* (2021.01)
*G06F 1/26* (2006.01)
*H01M 6/02* (2006.01)
*H04M 1/02* (2006.01)
*H01M 50/211* (2021.01)

(52) U.S. Cl.
CPC ..... *H01M 10/0436* (2013.01); *H01M 50/105* (2021.01); *H01M 50/211* (2021.01); *H01M 50/247* (2021.01); *H01M 50/512* (2021.01); *H04M 1/0262* (2013.01); *H01M 2220/30* (2013.01)

(58) Field of Classification Search
CPC .. H01M 50/512; H01M 2220/30; H01M 6/02; H04M 1/0262
See application file for complete search history.

(56) References Cited

U.S. PATENT DOCUMENTS

2010/0216023 A1  8/2010  Wei et al.
2014/0361747 A1  12/2014  Bouyssou et al.

* cited by examiner

MULTIPLE BATTERY CONFIGURATIONS FOR SPACE UTILIZATION

CROSS-REFERENCE TO RELATED APPLICATIONS

The present application is a national stage entry of PCT/US2019/036816 filed Jun. 12, 2019, the contents of which are hereby incorporated by reference.

BACKGROUND

Batteries can be used to temporarily provide electrical power to various devices when those devices are not connected to an external power source, for example. For a variety of reasons, batteries (and specifically rechargeable batteries) have become increasingly prevalent in many technology areas. The lithium-ion battery is an example of a rechargeable battery.

Because batteries can be used to provide electrical power to devices, such batteries may be integrated into such devices. For example, a rechargeable battery may be integrated into a consumer-electronic device such as a mobile phone, a tablet, or a laptop computer in order to provide power to such a device. When integrating a rechargeable battery into the consumer-electronic device, the battery's designed shape and size may be at least partially determined based on the available space within the device. Hence, the capacity of the battery may be adversely affected by the dimensions of the device.

SUMMARY

The specification and drawings disclose embodiments that relate to multiple battery configurations for space utilization.

In a first aspect, a device is disclosed. The device includes a primary battery. The device also includes an auxiliary battery configured to supply auxiliary electrical power. A first surface of the auxiliary battery is positioned along a first surface of the primary battery. The auxiliary battery is a thin-film battery. The first surface of the auxiliary battery has a smaller area than the first surface of the primary battery.

In a second aspect, a consumer-electronic device is disclosed. The consumer-electronic device includes a primary battery. The consumer-electronic device also includes an auxiliary battery configured to supply auxiliary electrical power. A first surface of the auxiliary battery is positioned along a first surface of the primary battery. The auxiliary battery is a thin-film battery. Further, the consumer-electronic device includes an interconnect that connects two or more components of the consumer-electronic device. The interconnect is positioned along the first surface of the primary battery adjacent to the auxiliary battery.

In a third aspect, a method is disclosed. The method includes providing electrical power to a consumer-electronic device by discharging a primary battery of the consumer-electronic device. The method also includes providing, upon the primary battery being discharged to a threshold value, electrical power to the consumer-electronic device by discharging an auxiliary battery of the consumer-electronic device. A first surface of the auxiliary battery is positioned along a first surface of the primary battery. The auxiliary battery is a thin-film battery. The first surface of the auxiliary battery has a smaller area than the first surface of the primary battery.

The foregoing summary is illustrative only and is not intended to be in any way limiting. In addition to the illustrative aspects, embodiments, and features described above, further aspects, embodiments, and features will become apparent by reference to figures and the following detailed description.

DETAILED DESCRIPTION

Figure 1A:
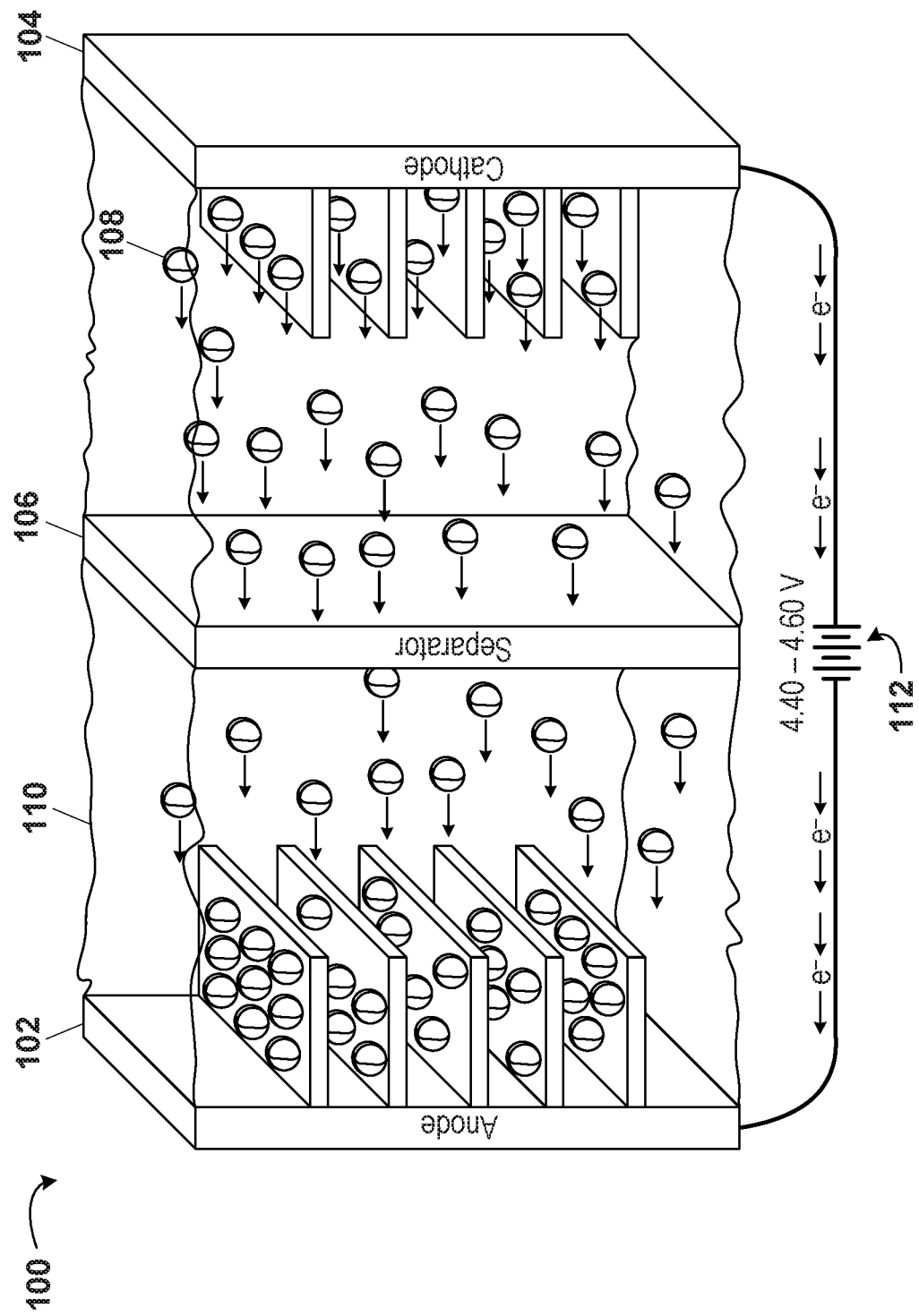
FIG. 1A is an illustration of a battery, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

Example embodiments relate to multiple battery configurations for space utilization.

Consumers continue to demand smaller and/or thinner form factors in electronic devices (e.g., mobile computing devices, tablet computing devices, and laptop computing devices). However, consumers also desire longer battery lifetime between charges. Shrinking the housing size of consumer-electronic devices inherently reduces the interior volume to accommodate batteries and other device components. This makes it advantageous to arrange the components of the device in a manner that makes efficient use of the space available within the case. In some instances, it can be useful for a device's battery to have an irregular shape (e.g., a curved or "step" shape) that helps the battery fill a corner or end space of the device that might otherwise be left empty. Using conventional techniques, it can be expensive and/or difficult to produce batteries having such shapes.

To at least partially ameliorate this problem, example embodiments disclosed herein include a primary battery (e.g., a planar or "jellyroll" lithium-ion battery) used in conjunction with a thin-film auxiliary battery to efficiently fill space within a consumer-electronic device housing. Such a multiple battery configuration may also accommodate the presence of interconnects (e.g., electronic cables) or other components (e.g., computing components, cooling devices, communication components, etc.). For example, the primary battery might have the approximate shape of a rectangular prism with a thickness that is the same across the entire primary battery (e.g., similar to a conventional battery). In addition, the thin-film auxiliary battery can be placed along a top surface of the primary battery, thereby taking advantage of unused space to provide additional energy storage (e.g., unused space underneath a display of the consumer-electronic device). The thin-film auxiliary battery may have a length and/or a width that does not span the entire top face of the primary battery, thereby providing a void for placement of an interconnect (e.g., a wire or cable) or another component between the case and the primary battery and/or the thin-film auxiliary battery. Further, the thin-film auxiliary battery may be a flexible battery, which can accommodate any swelling that occurs in the primary battery during charging/discharging. Additionally or alternatively, portions of the thin-film auxiliary battery or the primary battery may be excised to accommodate device components. In some examples, the thin-film auxiliary battery might be placed between the primary battery and the case of the consumer-electronic device or between the primary battery and a touchscreen of the consumer-electronic device to take advantage of space that would otherwise be left empty due to design constraints of a conventional battery (e.g., a fabrication tolerance between the desired thickness and the actual thickness of a conventional battery).

The thin-film auxiliary battery can be used to provide electrical power to the consumer-electronic device when the primary battery is sufficiently depleted. In another example, the thin-film auxiliary battery could be connected in parallel with the primary battery to provide an additional electrical power source during operation of the consumer-electronic device.

II. Example Devices

FIG. 1A is an illustration of a battery 100 (e.g., a single-celled battery). The battery 100 may be a rechargeable lithium-ion battery, for example. The battery 100 may include an anode 102, a cathode 104, a separator 106, and free lithium ions 108 within an electrolyte 110. The elements of the battery 100 are not necessarily illustrated to scale (e.g., the free lithium ions 108 may be significantly smaller than illustrated in the figure). Further, as illustrated in FIG. 1A, the battery 100 may be chargeable by an electrical power source 112 (e.g., a rectified alternating current (AC) signal, a separate charged battery, or a charged capacitor). In some embodiments, multiple cells of cathode, anode, separator, and electrolyte may be electrically arranged in series and/or parallel to form a composite battery. Such cell arrangements may enhance the capacity and/or voltage of the composite battery.

Charging may include electrons flowing from the cathode 104 to the anode 102 through circuitry external to the battery 100. In addition, charging may include free lithium ions 108, within the electrolyte 110 solution, flowing from the cathode 104 to the anode 102 through the separator 106. Further, charging may include the free lithium ions 108 being intercalated into the anode 102. Such a process is illustrated in FIG. 1A by the lithium ions that are sitting on "shelves" of the anode 102. The charging may represent a first formation charging process, in some embodiments. The first formation charging process may last between 10 hours and 20 hours, in some embodiments. Additionally, the battery 100 may be configured to undergo repeated charge/discharge cycles during a lifetime of the battery 100. For example, the battery 100 may be a rechargeable battery configured to be charged by external voltage between 4.20 volts and 4.50 volts or between 4.40 volts and 4.60 volts.

In various embodiments, various charging/recharging schemes may be used. For example, a constant voltage (CV) scheme may be used, where a constant voltage is applied across the terminals of the battery, resulting in a decreasing current as the battery charges, until the current reaches 0.0 Amps (or within a threshold current of 0.0 Amps), at which point the voltage source charging the battery is removed. In other embodiments, a constant current (CC) scheme may be used, where the voltage applied across the terminals of the battery by a charging device is varied such that the current is maintained at a constant rate. Once the battery voltage reaches a threshold value to maintain the continuous current, the battery may be determined to be charged, and the voltage source charging the battery may be removed.

Alternatively, in some embodiments, a hybrid constant current/constant voltage (CC/CV) charging mode may be used to charge the battery. The CC/CV charging mode may have two stages. In a first stage (a CC stage), the voltage may be increased continuously to maintain a constant current charging the battery. Then, once the voltage reaches a certain maximum charging voltage threshold, the second stage of the CC/CV charging mode may begin. In the second stage (a CV stage), the voltage may be maintained at the maximum charging voltage threshold, and the charging current may be allowed to decrease. Once the charging current readies a threshold level, indicating the battery is charged, the CC/CV charging mode may cease.

The anode 102 may be the negative terminal (electrode) of the battery 100. For example, the anode 102 may include one or more external electrical contacts on the side of the anode 102 facing away from the separator 106. The external electrical contact(s) may allow an electrical connection between the anode 102 and the power source 112 or a load to be made. The anode 102 may include graphite, Li, $Li_4Ti_5O_{12}$, a lithium-metal composite, and/or Si, in various embodiments.

The cathode 104 may be the positive terminal (electrode) of the battery 100. For example, the cathode 104 may include one or more external electrical contacts on the side of the cathode 104 facing away from the separator 106. The external electrical contact(s) may allow an electrical connection between the cathode 104 and the power source 112 or a load to be made. The cathode 104 may include $LiCoO_2$, $LiMn_2O_4$, a vanadium oxide, $LiNiMnCoO_2$, $LiNiCoAlO_2$, and/or an olivine (e.g., $LiFePO_4$), in some embodiments. Other lithium-containing cathode materials are possible and contemplated herein.

The separator 106 may prevent a short circuit of the cathode 104 to the anode 102 within the battery 100. For example, the separator 106 may include a semi-permeable membrane (e.g., permeable to the free lithium ions 108). To achieve such semi-permeability, the separator 106 may include micropores that are sized to selectively allow the passage of the free lithium ions 108 during charging or discharging processes. The semi-permeable membrane of the separator 106 may also have an amorphous or a semi-crystalline structure. Further, the semi-permeable membrane of the separator 106 may be polymeric (e.g., fabricated from cellulose acetate, nitrocellulose, cellulose esters, polysulfone, polyether sulfone, polyacrilonitrile, polyamide, polyimide, polyethylene, polypropylene, polytetrafluoroethylene, polyvinylidene fluoride, polyvinylchloride, and/or aramid). In addition, the separator 106 may be chemically and electrochemically stable for use within the battery 100 during charging and discharging processes. In some embodiments, the separator 106 may include a multi-layered structure.

In some embodiments, the separator 106 may be a non-standard separator having an increased mechanical stability, which can prevent dendrites from piercing the separator 106. Further, the separator 106 may also include compounds that are chemically and/or electrochemically stable for use within the battery 100 during charging or discharging processes. Such compounds may enhance the lifetime of the battery 100, for example.

In some embodiments, the battery 100 may be a thin-film battery. In such embodiments, the battery 100 may not include a separator 106. Further, in such embodiments, the electrolyte 110 may be solid (e.g., rather than liquid), thereby satisfying purposes of both the electrolyte 110 and the separator 106 (e.g., transporting ions and preventing a short circuit of the cathode 104 to the anode 102). In such embodiments, a discrete separator may not be needed.

The free lithium ions 108 may transfer between the anode 102 and the cathode 104 during charging/discharging processes of the battery 100. In some embodiments, the free lithium ions 108 may originate from the cathode 104. For example, the cathode 104 may include $LiCoO_2$, which may be a source of free lithium during the chemical reactions occurring during the charging process (e.g., during the first formation charging process). Other sources of free lithium ions are also possible. For example, the anode 102 may provide free lithium ions and/or lithium salts (e.g., $LiPF_6$, $LiBF_4$, $LiBC_4O_8$, $Li[PF_3(C_2F_5)_3]$, or $LiClO_4$) dissolved within the electrolyte 110 may provide free lithium ions.

The electrolyte 110 may be a medium through which the free lithium ions 108 travel during charging and discharging processes of the battery 100. The electrolyte 110 may be a gel or a liquid, in various embodiments and/or at various temperatures. For example, the electrolyte 110 may be an organic solvent (e.g., ethylene carbonate, dimethyl carbonate, or diethyl carbonate). Additives may be included within the electrolyte 110 to enhance the effectiveness of the electrolyte 110. In some embodiments, for instance, ionic liquids may be included within the electrolyte to reduce volatility of the electrolyte solution.

As described above, in some embodiments (e.g., embodiments where the battery 100 is a thin-film battery), the electrolyte 110 may be a solid (e.g, rather than a liquid or gel). For example, in some embodiments, the electrolyte 110 may include one or more amorphous glassy layers deposited on the cathode 104 (e.g., deposited using sputtering or vapor deposition). One type of amorphous glassy material that may be used is lithium phosphorous oxynitride (LiPON).

Figure 1B:
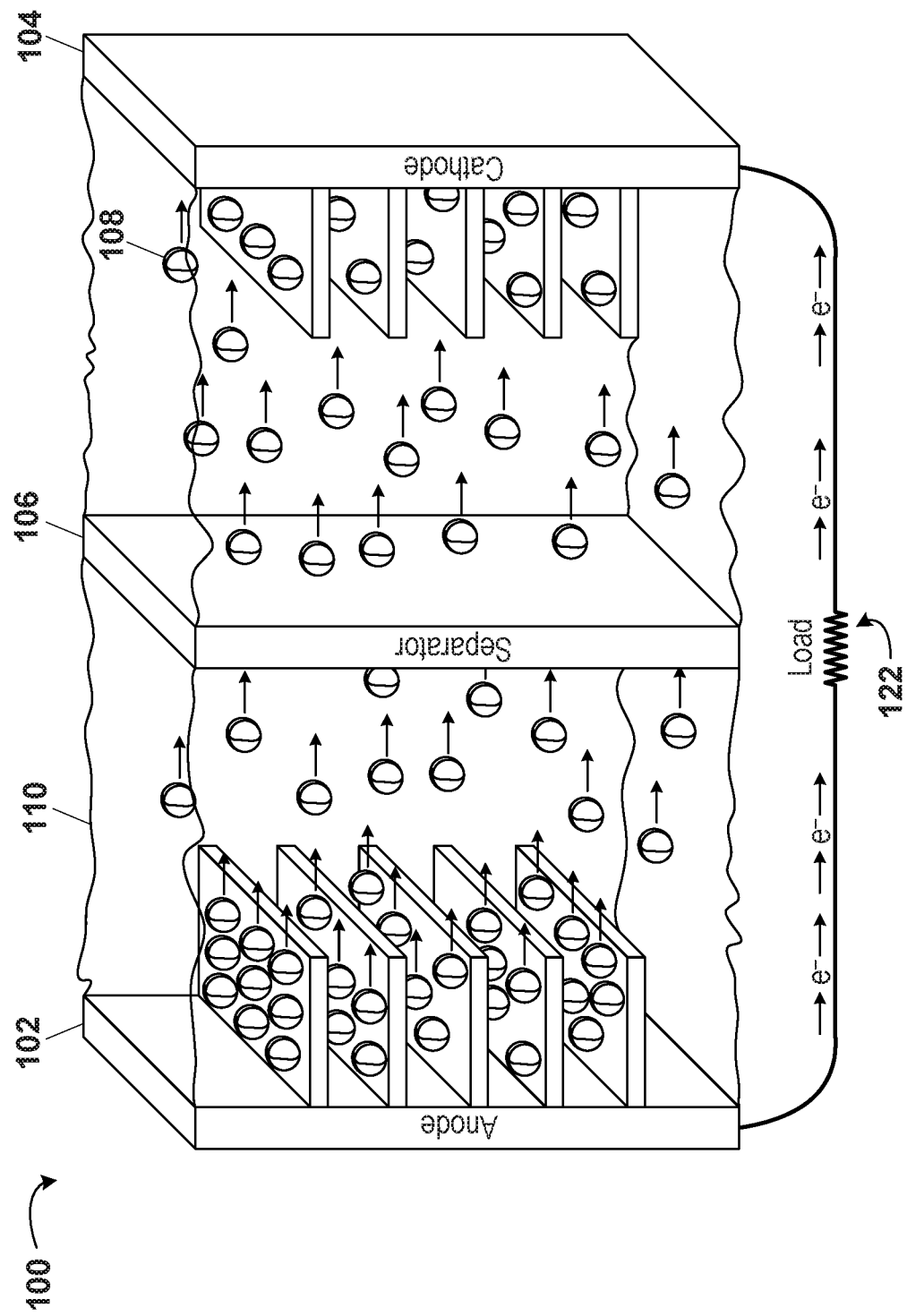
FIG. 1B is an illustration of a battery, according to example embodiments.

FIG. 1B is another illustration of the battery 100. The battery 100 illustrated in FIG. 1B may be discharging across a load 122. Discharging the battery 100 may include electrons flowing from the anode 102 to the cathode 104, across the load 122, through circuitry external to the battery 100. Discharging the battery 100 may also include the free lithium ions 108 within the electrolyte 110 flowing from the anode 102 to the cathode 104 through the separator 106 (in embodiments having a discrete separator). Further, discharging the battery 100 may include the free lithium ions 108 being intercalated into the cathode 104. Such a scenario is illustrated in FIG. 1B by the lithium ions that are sitting on "shelves" of the cathode 104.

The load 122 may be a device powered by the battery 100, such as an electric vehicle, a hybrid electric vehicle, a mobile device, a tablet computing device, a laptop computing device, a light source, television remote, headphones, etc. The load 122 may be powered by the flow of electrons through the circuitry external to the battery 100 during the discharging process, for example.

Figure 2A:
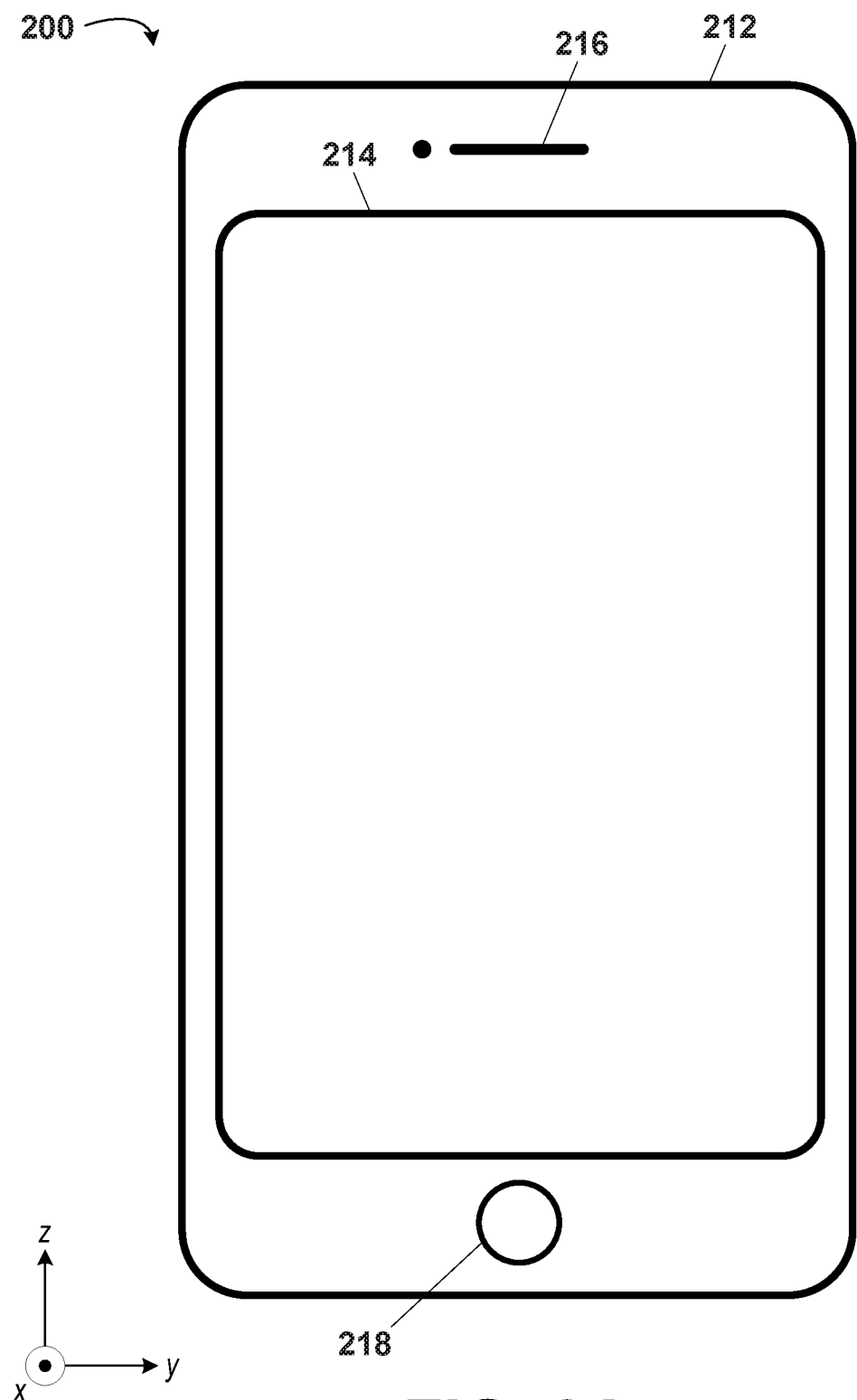
FIG. 2A is a front-view illustration of a mobile device, according to example embodiments.

FIG. 2A is a front-view (e.g., view from a plane perpendicular to the x-axis, as illustrated) illustration of a mobile device 200 (e.g., a smartphone according to example embodiments. The mobile device 200 may include a case 212, a display 214, peripherals 216, and an input device 218. The mobile device 200 shown and described herein is an example consumer-electronic device. It is understood that where the mobile device 200 is referenced herein, although the mobile device 200 is depicted and described as a mobile phone or smartphone, other consumer-electronic devices that incorporate batteries (e.g., activity trackers, calculators, camcorders, digital cameras, e-readers, electronic cigarettes, flashlights, game controllers, global positioning system (GPS) devices, headphones, hotspots, keyboards, laptop computing devices, mice, microphones, musical instruments, portable gaming systems, portable grooming devices, portable media players, power tools, radios, remote-control vehicles, remotes, robotic vacuum cleaners, smartwatches, smart home devices, smart speakers, smoke detectors, speakers, tablet computing devices, thermometers, toothbrushes, watches, wearables, etc.) could equally be used and could equally benefit from the embodiments disclosed herein (with appropriate modifications made).

The case 212 may be a plastic and/or metallic enclosure that encapsulates the interior of the mobile device 200. In some embodiments, the case 212 may have an ergonomic shape. For example, as illustrated in FIG. 2A, the case 212 may have beveled corners. The shape and/or size of the case 212 may be designed to house the interior electronic components of the mobile device 200 (e.g., a processor, a non-volatile memory, a volatile memory, one or more interconnects, a motherboard, an antenna, etc.) and one or more power-supplying devices (e.g., batteries). Further, the case 212 may have one or more portions excised so as to accommodate exterior components of the mobile device 200 (e.g., an opening in which to mount the display 214 or an opening through which sound can pass to and/or from a speaker or a microphone may be created by excising a portion of the case 212).

The display 214 may provide information to a user of the mobile device 200. For example, the display 214 may display text, images, and/or video content to a user to facilitate interaction between the user and the mobile device 200. In various embodiments, the display 214 tray include a light-emitting diode (LED) display, a liquid-crystal display (LCD), a cathode ray tube (CRT), a projection device, an electronic ink (e-ink) display, a light bulb, etc. In some embodiments, the display 214 may receive electrical power from one or more batteries of the mobile device 200.

The peripherals 216 may be additional components of the mobile device 200 that enhance the functionality of the mobile device 200. For example, the peripherals may include speakers, microphones, cameras, headphones, wearable sensors, mice, keyboards, scanners, laser pointers, game controllers, external storage devices external hard drives or flash drives), printers, etc. Similar to the display 214, in some embodiments, the peripherals 216 may receive electrical power from one or more batteries of the mobile device 200.

The input device 218 may receive input from a user of the mobile device 200. For example, as illustrated in FIG. 2A, the input device 218 may include a button. Additionally or alternatively, the input device 218 may include other devices for receiving input. For example, in some embodiments, the display 214 may include a touchscreen (e.g., a capacitive touchscreen, a resistive touchscreen, or a surface acoustic wave touchscreen). In such embodiments, the display 214 may receive input from a user in addition to providing output to a user.

Figure 2B:
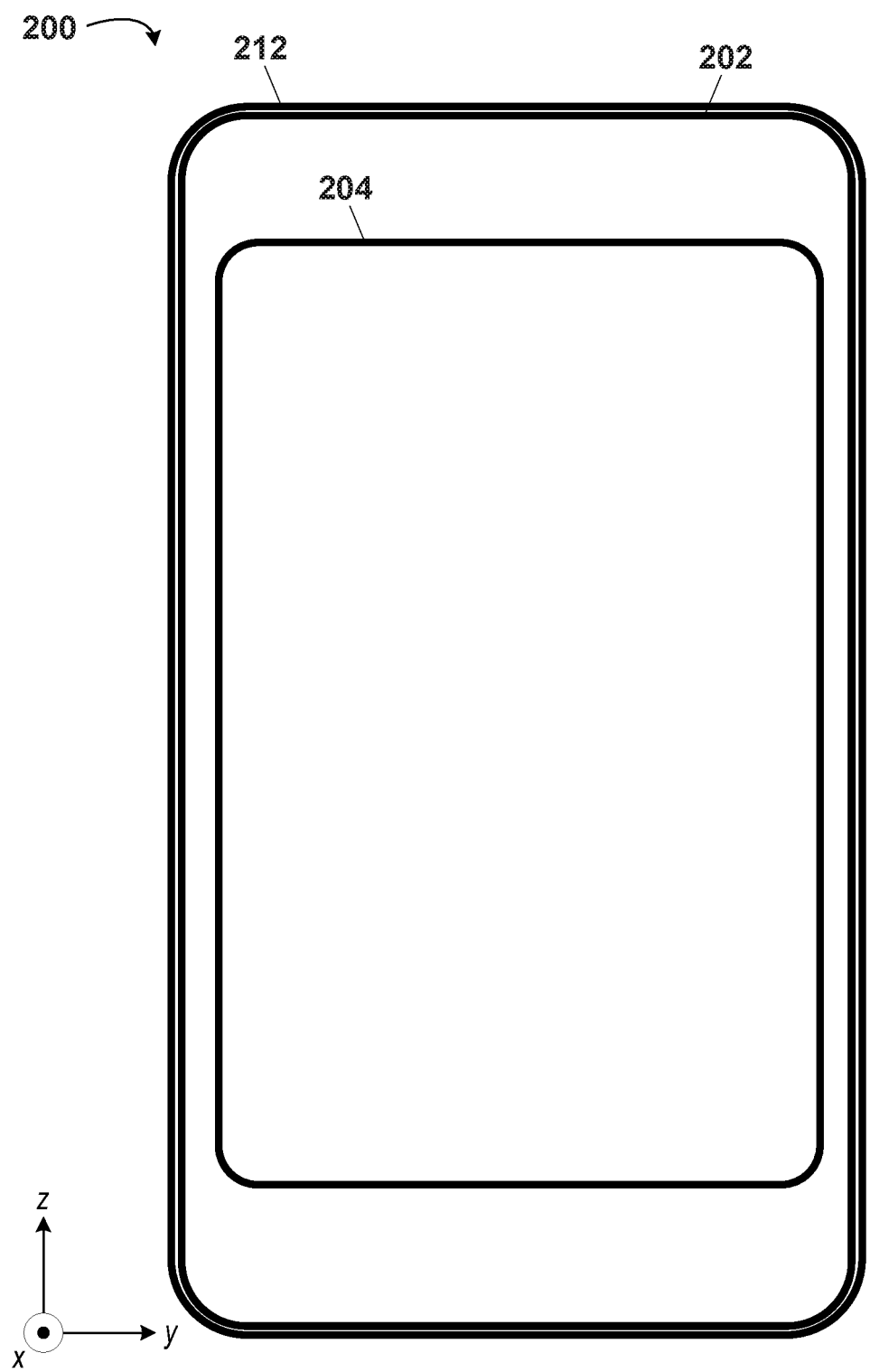
FIG. 2B is a cut-away illustration of a mobile device, according to example embodiments.

FIG. 2B is a cut-away illustration (e.g., as viewed from a plane perpendicular to the x-axis, as illustrated) of the mobile device 200, according to example embodiments. For example, FIG. 2B may depict the mobile device 200 when viewed from an x-location (as indicated by the axes in FIG. 2B) that is behind both the display 214 and a front face of the case 212. As illustrated, the mobile device 200 may include a primary battery 202 and an auxiliary battery 204. The primary battery 202 and the auxiliary battery 204 may be contained by the case 212, as illustrated.

The primary battery 202 may supply electrical power to components of the mobile device 200. For example, the primary battery 202 may include a rechargeable battery (e.g., a lithium-ion battery similar to the battery 100 illustrated in FIGS. 1A and 1B) having terminals that are connected to circuitry within the mobile device 200 (e.g., electrically coupled to a motherboard within the mobile device 200 and/or to the display 214). Further, the primary battery 202 may be connectable to an external power source (e.g., a wall socket) in order to recharge the primary battery 202. For example, a charging port defined within the case 212 of the mobile device 200 may permit a charging cable to be connected to the mobile device 200 in order to charge the primary battery 202. Alternatively, the primary battery 202 could be charged via wireless charging (e.g., using inductive coupling with an external power source). In some embodiments, the primary battery 202 may have a capacity between 2,500 mAh and 3,500 mAh.

Depending on the manner in which the primary battery 202 is fabricated (which may depend on constraints such as a size and/or shape of the case 212 and/or sizes and/or shapes of other components within the mobile device 200), the primary battery 202 may have various shapes or conformations. In some embodiments, for example, the primary battery 202 may be arranged in a jellyroll conformation (e.g., a flattened jellyroll conformation to occupy reduced space). In such embodiments, the primary battery 202 may be fabricated by positioning one or more anodes adjacent to one or more cathodes with a separator in between, filling one or more defined interstices between the cathode(s), anode(s), and separator with an electrolyte, and then rolling the arrangement to form a jellyroll. Further, such a jellyroll conformation may be encapsulated in a metallic or plastic cylindrical casing (e.g., to prevent leakage of electrolyte solution and/or to enhance safety in the case of battery failure). In alternate embodiments, the primary battery 202 may be arranged in a pouch conformation. In some embodiments, the pouch conformation may increase the gravimetric energy density of the primary battery 202 compared to the jellyroll conformation because no cylindrical casing is used.

The auxiliary battery 204 may supply supplementary electrical power to components of the mobile device 200. In some embodiments, the capacity of the auxiliary battery 204 may be less than the capacity of the primary battery 202. For example, the auxiliary battery 204 may have a capacity between 50 mAh and 200 mAh. In some embodiments, the auxiliary battery 204 may have a different battery chemistry than the primary battery 202 and/or have a different shape or conformation than the auxiliary battery 204. For example, the auxiliary battery 204 may be a thin-film battery (e.g., a thin-film lithium-ion battery). As such, the auxiliary battery 204 may not be susceptible to swelling during charge/discharge cycles (e.g., unlike conventional lithium-ion batteries). Additionally or alternatively, the auxiliary battery 204 may be flexible. As such, the auxiliary battery 204 can be installed in the mobile device 200 to fill space that would otherwise be unoccupied within the mobile device 200 due to: (i) fabrication tolerances for the case 212, the display 214, the primary battery 202, or other components of the mobile device 200; (ii) accommodation of potential swelling of the primary battery 202 during charging and/or discharging of the primary battery 202; and/or (iii) challenges in performing fabrication techniques for the primary battery 202 that would allow the primary battery 202 to have a non-uniform height (e.g., such that the primary battery 202 could fill a non-uniform cavity within the case 212 of the mobile device 200, as may be present in a mobile device with an exotic geometry).

As illustrated in FIG. 2B, a first surface of the auxiliary battery 204 (e.g., a back surface of the auxiliary battery 204 parallel to the y-z plane, as illustrated) may be positioned along a first surface of the primary battery 202 (e.g., a front surface of the primary battery 202 parallel to the y-z plane, as illustrated). As such, the first surface of the auxiliary battery 204 may be parallel to the first surface of the primary battery 202. In some embodiments, the first surface of the auxiliary battery 204 may be adhered to the first surface of the primary battery 202. Additionally or alternatively, the first surface of the auxiliary battery 204 may be aligned to one or more locations on the first surface of the primary battery 202 prior to the case 212 of the mobile device 200 encapsulating the primary battery 202 and the auxiliary battery 204. Further, as illustrated in FIG. 2B, the first surface of the auxiliary battery 204 may have a smaller area than the first surface of the primary battery 202.

In some embodiments, the auxiliary battery 204 may be rechargeable using the same charging mechanism as the primary battery 202. For example, a single charging port defined within the case 212 may be used to connect the primary battery 202 and the auxiliary battery 204 to an external power source (e.g., to a wall socket using a charging cable or to a computing device using a universal serial bus (USB) cable) to simultaneously or sequentially charge both the primary battery 202 and the auxiliary battery 204. In alternate embodiments, a separate charging meth, could be used to charge the auxiliary battery 204. For example, the auxiliary battery 204 could be charged via wireless charging (e.g., using inductive coupling with an external power source) or using a secondary, dedicated charging port defined within the case 212 that is used to connect an external power source only to the auxiliary battery 204 (and not to the primary battery 202), thereby charging only the auxiliary battery 204.

Figure 2C:
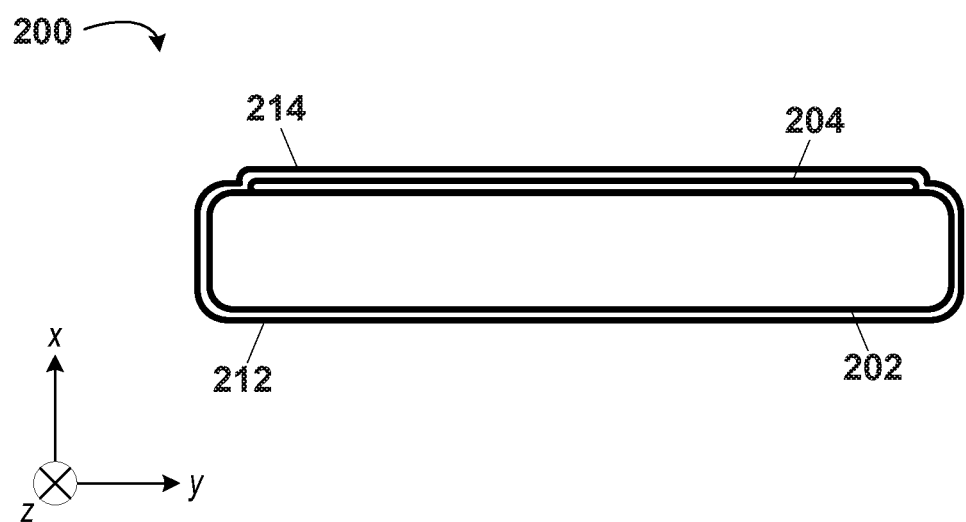
FIG. 2C is a bottom-view illustration of a mobile device, according to example embodiments.

FIG. 2C is a bottom-view view from a plane perpendicular to the z-axis, as illustrated) illustration of the mobile device 200, according to example embodiments. As illustrated in FIG. 2C, the shape and size of the primary battery 202 and the auxiliary battery 204 may be selected so as to conform to one or more available volumes within the mobile device 200 and/or so as to conform with one or more contours of the case 212. For example, one or more edges of the primary battery 202 and/or of the auxiliary battery 204 may be contoured so as to conform to one or more contoured edges or other features of the case 212. As described with reference to FIG. 2B, the first surface of the auxiliary battery 204 (e.g., a back surface of the auxiliary battery 204 parallel to the y-z plane, as illustrated) may be positioned along the first surface of the primary battery 202 (e.g., a front surface of the primary battery 202 parallel to the y-z plane, as illustrated).

As described above, the auxiliary battery 204 may be a thin-film battery. As such, a thickness of the auxiliary battery 204 (i.e., the shortest length dimension of the auxiliary battery 204, measured along the x-axis illustrated in FIG. 2C) may be less than a thickness of the primary battery 202 (i.e., the length dimension of the primary battery 202, measured along the x-axis illustrated in FIG. 2C). In some embodiments, the thickness of the auxiliary battery 204 may be between 0.25 mm and 0.50 mm, for example. The thickness of the primary battery 202, however, may be between 3.0 mm and 6.0 mm.

Figure 2D:
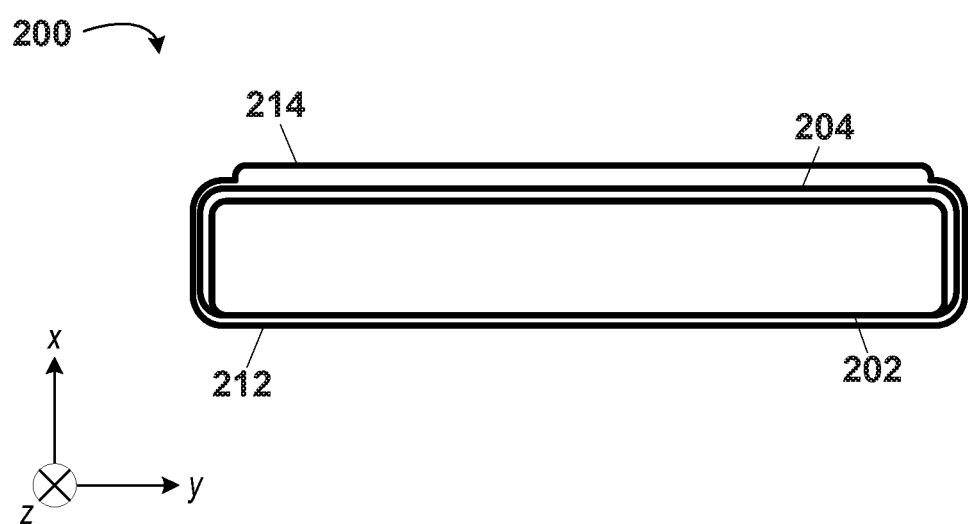
FIG. 2D is a bottom-view illustration of a mobile device, according to example embodiments.

In some embodiments, the auxiliary battery 204 may be positioned along additional surfaces of the primary battery 202, in addition to the first surface of the primary battery 202. For example, the auxiliary battery 204 may be wrapped around two, three, four, five, or six sides of the primary battery 202. An example embodiment where the auxiliary battery 204 is wrapped around three sides of the primary battery 202 is shown in bottom-view in FIG. 2D. Wrapping the auxiliary battery 204 around multiple sides of the primary battery 202 may further enhance the space in the case 212 that is occupied by a battery that can provide electrical power to components of the mobile device 200.

Figure 2E:
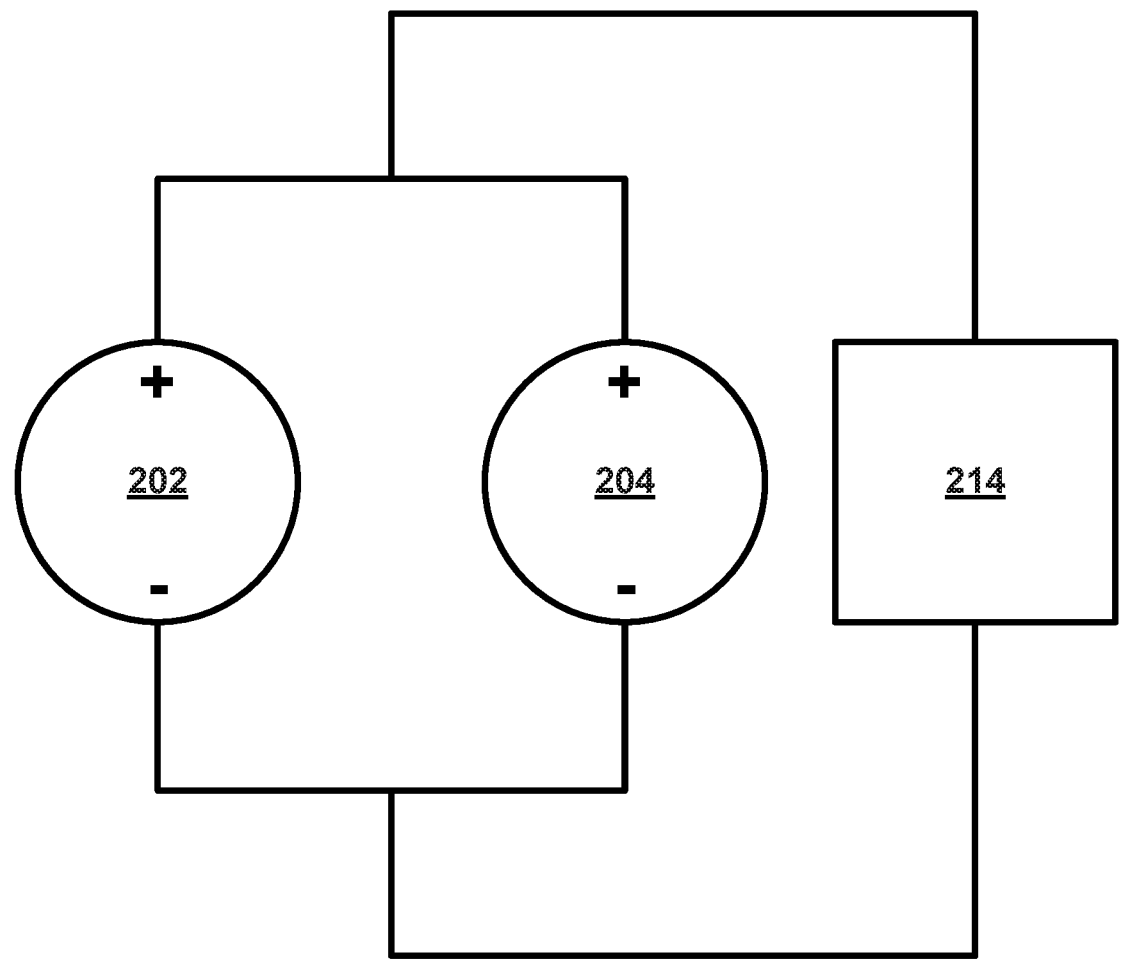
FIG. 2E is a circuit diagram illustrating an arrangement of batteries, according to example embodiments.

In some embodiments, the primary battery 202 and the auxiliary battery 204 may supply electrical power to components of the mobile device 200 simultaneously. For example, FIG. 2E is a circuit diagram illustrating an arrangement of batteries, according to example embodiments. The arrangement of batteries may include the primary battery 202 and the auxiliary battery 204 of the mobile device 200 illustrated in FIGS. 2A-2C electrically connected in parallel. In such an embodiment, charge from the primary battery 202 and the auxiliary battery 204 may simultaneously power components of the mobile device 200 (e.g., the display 214 of the mobile device 200, as illustrated, or any other component of the mobile device 200). Further, because some of the electrical power to the mobile device 200 is being provided by the auxiliary battery 204, the aggregate battery life of the mobile device 200 can be extended by including the auxiliary battery 204 in the mobile device 200 in addition to the primary battery 202.

In other embodiments, the primary battery 202 and the auxiliary battery 204 may supply electrical power to components of the mobile device 200 sequentially. For example, the primary battery 202 may initially solely provide electrical power to components of the mobile device 200 and, upon threshold discharge of the primary battery 202, the primary battery 202 may cease providing electrical power to components of the mobile device 200 and the auxiliary battery 204 may begin providing electrical power to components of the mobile device 200. The shift from the primary battery 202 providing electrical power to the auxiliary battery 204 providing electrical power may occur by engaging one or more switches within the mobile device 200.

Figure 2F:
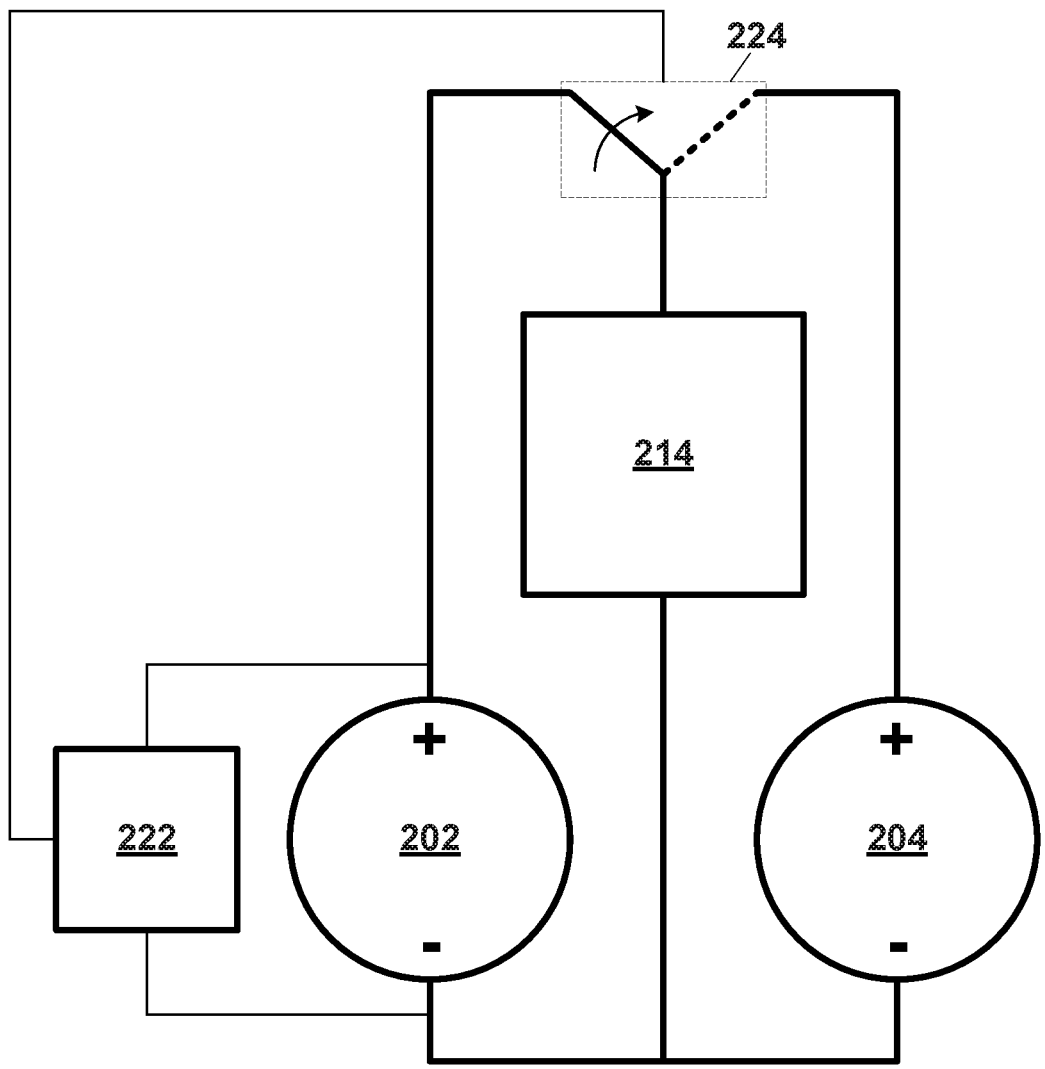
FIG. 2F is a circuit diagram illustrating an arrangement of batteries, according to example embodiments.

FIG. 2F is a circuit diagram illustrating an arrangement of batteries, according to example embodiments. The arrangement of batteries may include the primary battery 202 and the auxiliary battery 204 of the mobile device 200 illustrated in FIGS. 2A-2C. Also illustrated in FIG. 2F is a controller 222 and a switch 224. The controller 222 may include a voltmeter or a digital multimeter used to monitor the voltage between the terminals of the primary battery 202. As the primary battery 202 is discharged (e.g., when providing electrical power to components of the mobile device 200), the voltage between the terminals of the primary battery 202 may decrease according to a predetermined discharge curve (e.g., as determined empirically for the primary battery 202 during a calibration or fabrication process). Hence, the voltage between the terminals of the primary battery 202 can be used to estimate the state of charge of the primary battery 202.

Figure 2G:
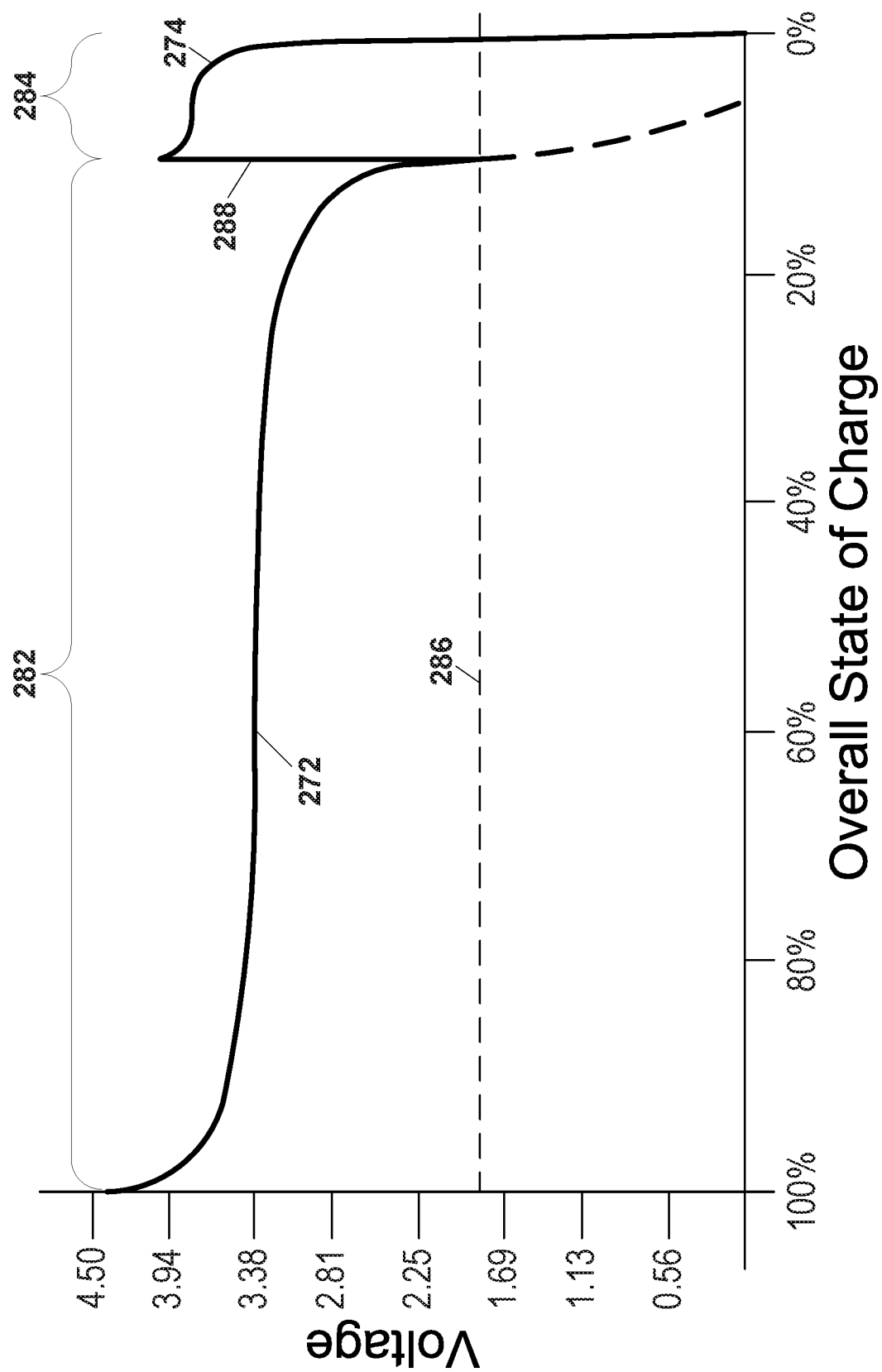
FIG. 2G is a plot of battery voltage within a mobile device as it discharges, according to example embodiments.

FIG. 2G is a plot of battery voltage within a mobile device (e.g., a mobile device including the battery arrangement of FIG. 2F) as the mobile device discharges, according to example embodiments. In FIG. 2G, the predetermined discharge curve 272 for the primary battery 202 is illustrated (the dashed portion indicating how the primary battery 202 would continue to discharge if the switch in FIG. 2F were never engaged such that the primary battery 202 ceased providing electrical power). The measured voltage between the terminals of the primary battery 202 may be transmitted to a processor within the controller 222. The processor may be executing instructions stored on a non-transitory, computer-readable medium (e.g., in a non-volatile memory, such as a hard drive). These instructions may include a threshold value 286 (e.g., a threshold voltage) below which, the primary battery 202 is too discharged to provide significant electrical power to the mobile device 200. Hence, once it is determined by the controller 222 that the voltage between the terminals of the primary battery 202 has fallen below the threshold value 286, the controller 222 may cause the switch 224 to flip (i.e., engage).

As illustrated in FIG. 2G, the threshold value 286 may be a threshold voltage. In alternate embodiments, the threshold value 286 may be a different quantity (e.g., a threshold current, a threshold state of charge, or a threshold amount of time discharging). For example, in other embodiments, rather than measuring the voltage between the terminals of the primary battery 202 (e.g., as illustrated in FIG. 2F), an ammeter may be used to measure the current being provided by the primary battery 202 in order to estimate the state of charge of the primary battery 202. Similar to the voltage between the terminals of the primary battery 202, the current being provided by the primary battery 202 may also follow a predetermined curve that can be used to determine the present state of charge of the battery. Also similar to the voltage between the terminals, the current being provided could be transmitted to a processor within the controller 222 and, once the current reaches a threshold value, the controller 222 could cause the switch 224 to flip. Additionally or alternatively, the amount of time that the primary battery 202 has spent discharging and those applications/devices within the mobile device 200 that are consuming electrical power during that time could be monitored by the controller 222 to approximate the state of charge of the primary battery 202 (e.g, and the controller 222 may similarly cause the switch 224 to flip once a threshold time-power combination has been reached).

As illustrated in FIG. 2F, once the switch 224 flips, the switch 224 may be in the position of the dashed line. Further, once the switch 224 flips, the auxiliary battery 204 may begin providing components of the mobile device 200 (e.g., the display 214) with electrical power. The act of flipping the switch 288 is reflected in FIG. 2G. Once the auxiliary battery 204 begins to discharge, it too follows a predetermined discharge curve 274 (e.g., as determined empirically for the auxiliary battery 204 during a calibration or fabrication process). The controller 222 may cause the switch 224 to flip for other purposes as well (e.g., to select one of the batteries 202/204 to be charged by a charging circuit when an external power source is provided, such as to select the auxiliary battery 204 to be charged when the primary battery 202 has been charged sufficiently such that the voltage between the terminals of the primary battery 202 exceed the threshold value 286). Also illustrated in FIG. 2G are the primary battery's portion 282 and the auxiliary battery's portion 284 of the aggregate state of charge of the battery combination illustrated in FIG. 2F. As illustrated in FIG. 2G, the primary battery's portion 282 is significantly larger (e.g., about 90%) than the auxiliary battery's portion 284 (e.g., about 10%), meaning that the primary battery 202 supplies significantly more electrical power to the components of the mobile device 200 than the auxiliary battery 204 during a complete charge/discharge cycle of the battery combination illustrated in FIG. 2F. FIG. 2G is provided by way of example, and it is understood that other percentages than those illustrated in FIG. 2G are equally possible.

In alternate embodiments, rather than the primary battery 202 and the auxiliary battery 204 being electrically connected in parallel (e.g., as schematically illustrated in FIG. 2E) or being engaged/disengaged in a switching arrangement (e.g., as schematically illustrated in FIG. 2F), the primary battery 202 and the auxiliary battery 204 may instead be used in totally separate circuits within the mobile device 200. For example, the primary battery 202 may be used to power one subset of components of the mobile device 200 (e.g., a processor and the display 214) while the auxiliary battery 204 may be used to power a different subset of components of the mobile device 200 (e.g., components that generally consume less electrical power than the components configured to receive electrical power from the primary battery 202, such as one or more status LEDs). In some embodiments, the primary battery 202 and the auxiliary battery 204 may be positioned within the mobile device 200 such that a distance between the primary battery 202 and one or more components configured to receive electrical power from the primary battery 202 is less than a distance between the auxiliary battery 204 and one or more components configured to receive electrical power from the primary battery 202. Similarly, the primary battery 202 and the auxiliary battery 204 may be positioned within the mobile device 200 such that a distance between the auxiliary battery 204 and one or more components configured to receive electrical power from the auxiliary battery 204 is less than a distance between the primary battery 202 and one or more components configured to receive electrical power from the auxiliary battery 204.

Figure 3A:
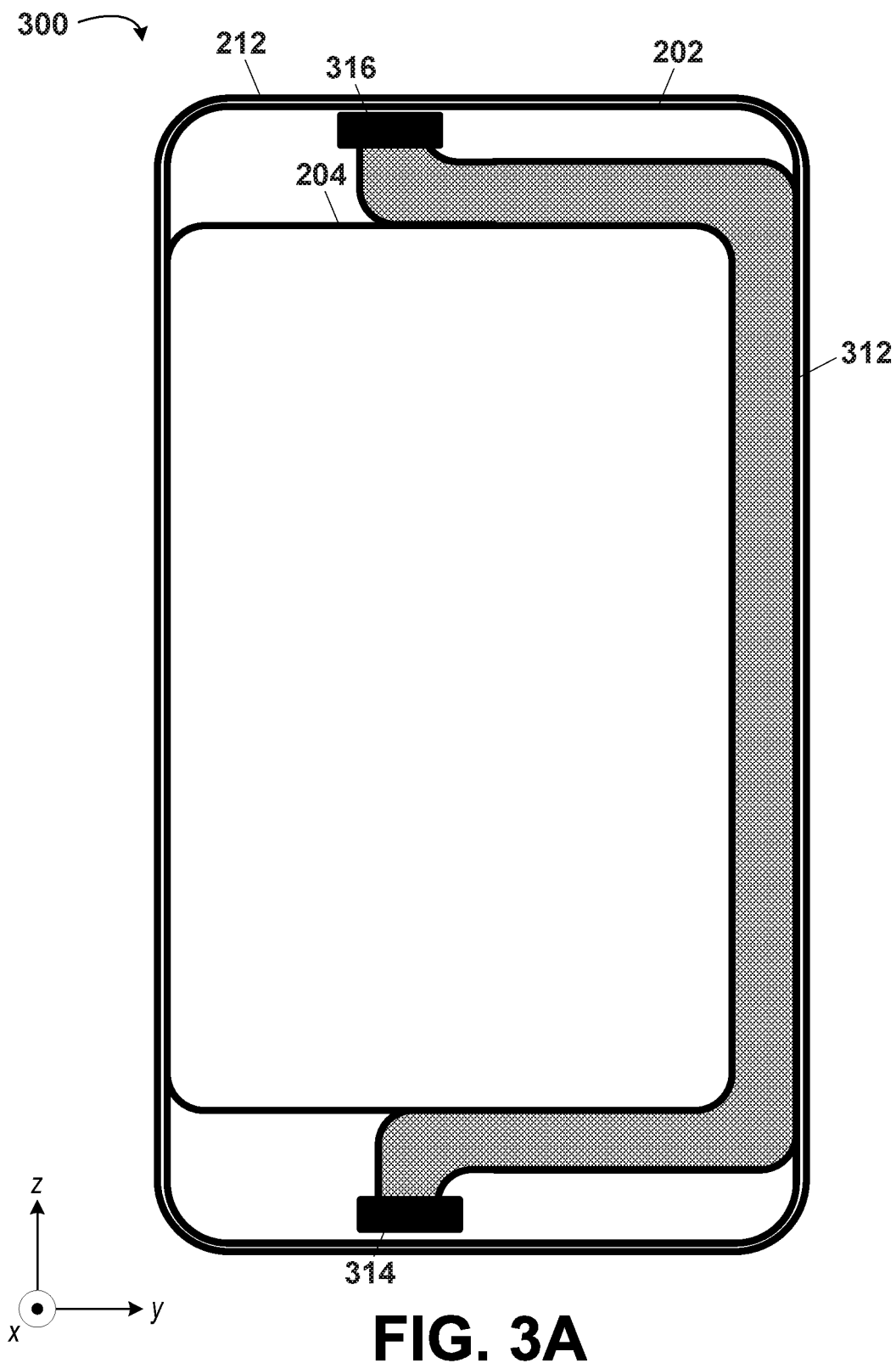
FIG. 3A is a cut-away illustration of a mobile device, according to example embodiments.

FIG. 3A is a cut-away illustration as viewed from a plane perpendicular to the x-axis, as illustrated) of a mobile device 300, according to example embodiments. Similar to the mobile device 200 illustrated in FIGS. 2A-2C, the mobile device 300 may include a primary battery 202, an auxiliary battery 204, a case 212, and a display 214. In addition, the mobile device 300 may also include an interconnect 312 between a first component 314 and a second component 316. The interconnect 312 may permit electrical power transfer between the first component 314 and the second component 316 and/or communication between the first component 314 and the second component 316 (e.g., using a communication signal). In some embodiments, the interconnect 312 may include one or more wires and/or traces on a circuit board that electrically connect the first component 314 to the second component 316.

As illustrated in FIG. 3A, the interconnect 312 may be routed around a periphery of the auxiliary battery 204. For example, the interconnect 312 may include a wire that is positioned along the first surface of the primary battery 202 such that the wire follows the edge of the auxiliary battery 204. In some embodiments, the auxiliary battery 204 may be designed (e.g., a size and/or shape of the auxiliary battery 204 may be chosen) and/or positioned along the first surface of the primary battery 202 such that the interconnect 312 can be accommodated along the first surface of the primary battery 202. Additionally or alternatively, the auxiliary battery 204 may be shaped so as to accommodate one or more other components of the mobile device 200 positioned adjacent to the auxiliary battery 204 along the first surface of the primary battery 202.

Figure 3B:
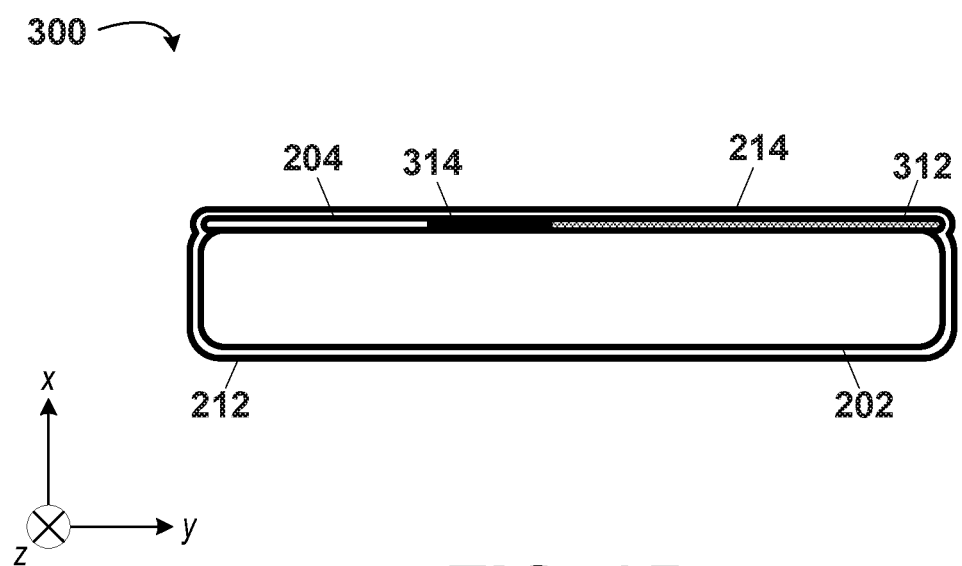
FIG. 3B is a bottom-view illustration of a mobile device, according to example embodiments.

FIG. 3B is a bottom-view (e.g., view from a plane perpendicular to the z-axis, as illustrated) illustration of the mobile device 300, according to example embodiments. As illustrated, in some embodiments, the thickness of the auxiliary battery 204 (i.e., the shortest length dimension of the auxiliary battery 204, measured along the x-axis illustrated in FIG. 3B) may be the same as a thickness of the interconnect 312 and/or the thickness of the first component 314. Further, in some embodiments, the thickness of the auxiliary battery 204 may also be the same as the thickness of the second component 316. In alternate embodiments, the auxiliary battery 204 may have a different thickness than the interconnect 312, the first component 314, and/or the second component 316.

Figure 4A:
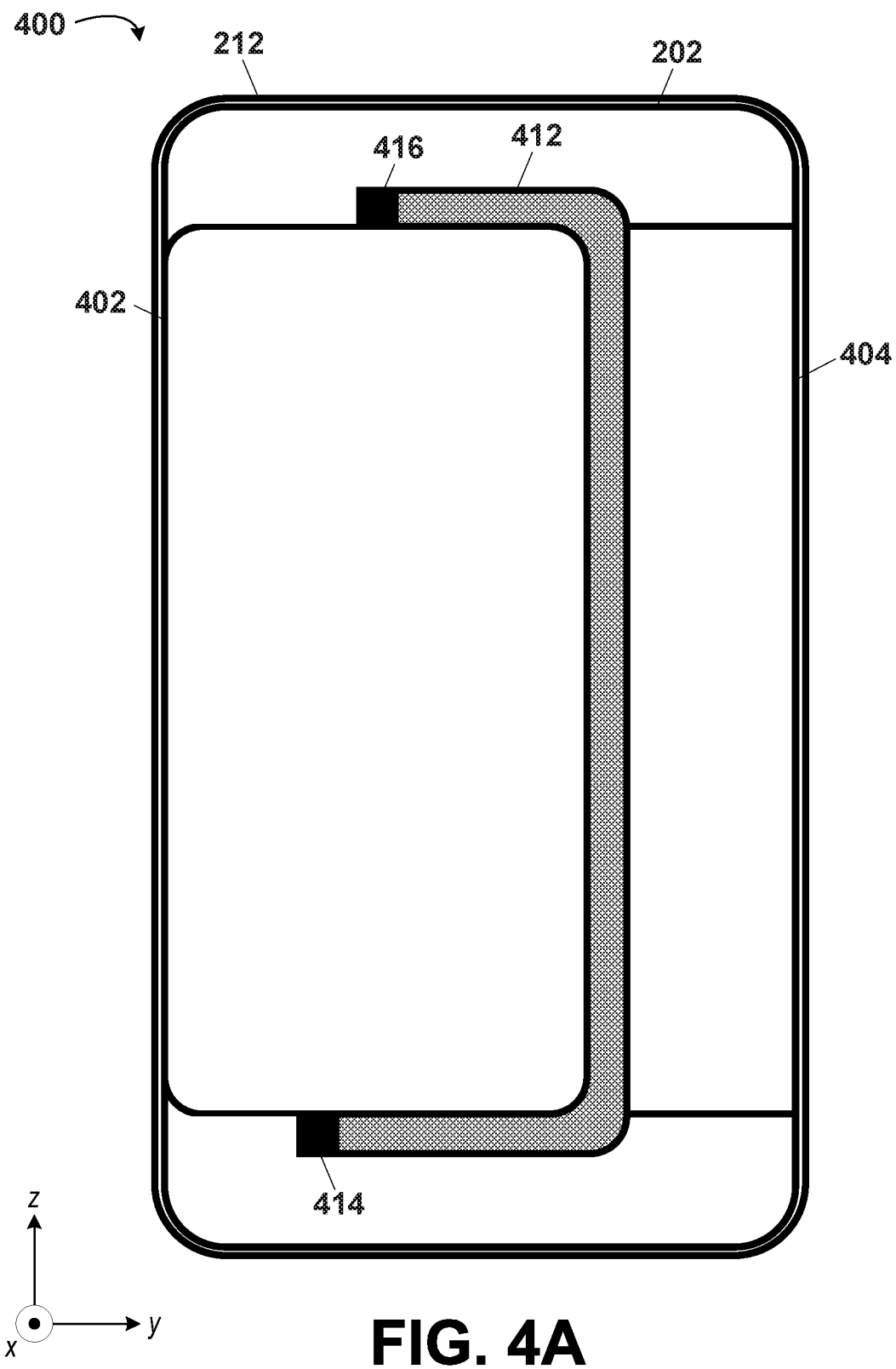
FIG. 4A is a cut-away illustration of a mobile device, according to example embodiments.

FIG. 4A is a cut-away illustration (e.g., as viewed from plane perpendicular to the x-axis, as illustrated) of a mobile device 400, according to example embodiments. Similar to the mobile device 200 illustrated in FIGS. 2A-2C, the mobile device 400 may include a primary battery 202, an auxiliary battery 402, a case 212, and a display 214. In addition, the mobile device 400 may include an additional auxiliary battery 404 and an interconnect 412 between a first component 414 and a second component 416. Unlike the embodiments described above, the embodiment of FIG. 4A includes two auxiliary batteries 402/404. Like the auxiliary battery 204 described above, both of the auxiliary batteries 402/404 may be configured to supply auxiliary electrical power to one or more components of the mobile device 400. Further, the auxiliary batteries 402/404 may supply electrical power to components of the mobile device 400; (i) simultaneously with the primary battery 202 or sequentially with the primary battery 202; and (ii) simultaneously with one another or sequentially with one another.

Figure 4B:
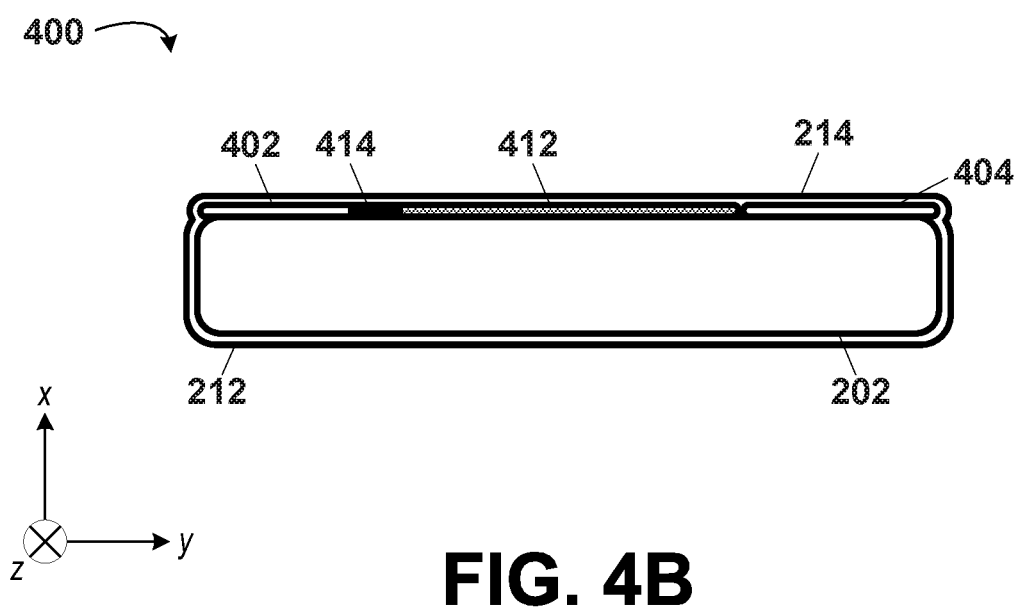
FIG. 4B is a bottom-view illustration of a mobile device, according to example embodiments.

In some embodiments, a first surface of the auxiliary battery 402 and a first surface of the additional auxiliary battery 404 may each be positioned along the first surface of the primary battery 202. FIG. 4B is a bottom-view view from a plane perpendicular to the z-axis, as illustrated) illustration of the mobile device 400, according to example embodiments. As illustrated in FIG. 4B, the auxiliary battery 402 and the additional auxiliary battery 404 may be substantially parallel to one another (e.g., within 5° of parallel with one another). For example, a first surface of the auxiliary battery 402 positioned along the first surface of the primary battery 202 and a first surface of the additional auxiliary battery 404 positioned along the first surface of the primary battery 202 may be coplanar with one another.

The interconnect 412 may also be positioned along the first surface of the primary battery 202. In some embodiments, the interconnect 412, the first component 414, and/or the second component 416 may be adjacent to the auxiliary battery 402 and/or the additional auxiliary battery 404. Further, the interconnect 412 may be routed along a periphery of the auxiliary battery 402 and/or along a periphery of the additional auxiliary battery 404. Because multiple auxiliary batteries 402/404 are positioned along the first surface of the primary battery 202, and the interconnect 412 may be positioned along a periphery of one or both of the auxiliary batteries 402/404, in some embodiments, one or both of the auxiliary batteries 402/404 may be smaller than the auxiliary battery 204 illustrated in FIGS. 2A-2C.

In some embodiments, the additional auxiliary battery 404 may have a different shape, capacity, and/or battery chemistry than the auxiliary battery 402. For example, based on the location of the interconnect 412 and the components 414/416 of the mobile device 400, the amount of space available for the additional auxiliary battery 404 may be less than the amount of space available for the auxiliary battery 402 (e.g., as illustrated in FIG. 4A). In such embodiments, the additional auxiliary battery 404 may be smaller in size and capacity than the auxiliary battery 402. FIG. 4A is provided by way of example, and it is understood that other sizes or shapes of the auxiliary batteries 402/404, the interconnect 412, and the components 414/416 are possible and contemplated herein.

As illustrated in FIG. 4B, in some embodiments, the thickness of the auxiliary battery 402 (i.e., the shortest length dimension of the auxiliary battery 402, measured along the x-axis illustrated in FIG. 4B) may be the same as a thickness of the interconnect 412 and/or the thickness of the first component 414. Similarly, the thickness of the additional auxiliary battery 404 (i.e., the shortest length dimension of the additional auxiliary battery 404, measured along the x-axis illustrated in FIG. 4B) may be the same as a thickness of the interconnect 412 and/or the thickness of the first component 414. Further, in some embodiments, the thicknesses of one or both of the auxiliary batteries 402/404 may be the same as the thickness of the second component 416. Still further, the thickness of the auxiliary battery 402 may be the same as the thickness of the additional auxiliary battery 404. In alternate embodiments, the thickness of the additional auxiliary battery 404 may be different from the thickness of the auxiliary battery 402 (e.g., to efficiently fill a on-uniform cavity within the case 212 of the mobile device 400). Additionally or alternatively, one or both of the auxiliary batteries 402/404 may have different thicknesses than the interconnect 412, the first component 414, and/or the second component 416.

Figure 5A:
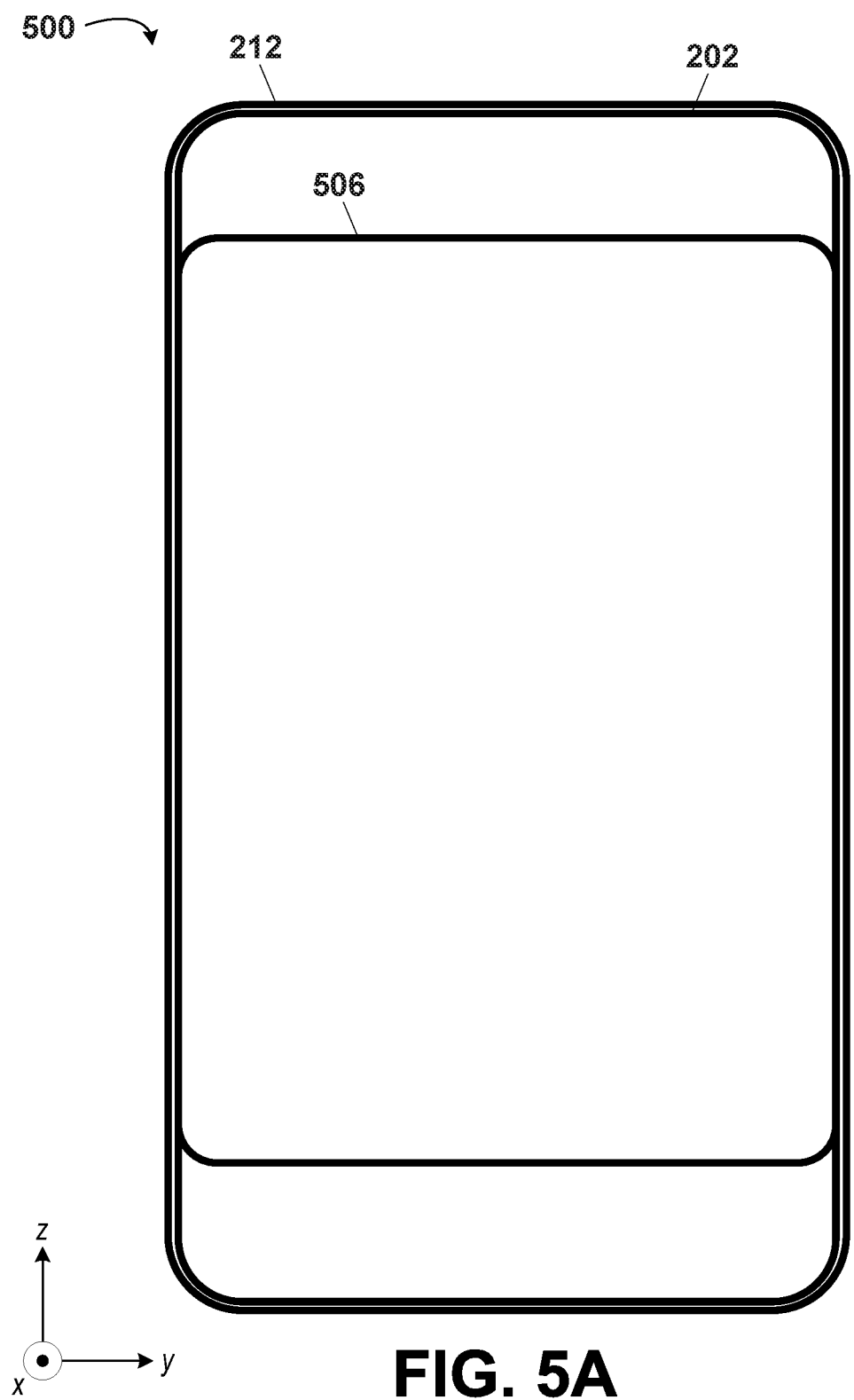
FIG. 5A is a cut-away illustration of a mobile device, according to example embodiments.
Figure 5B:
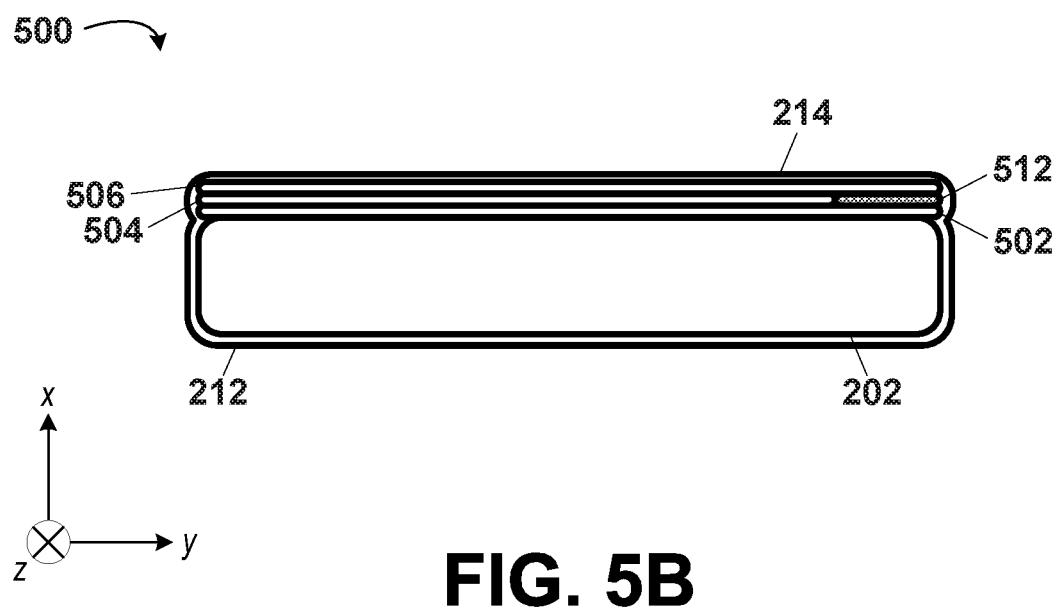
FIG. 5B is a bottom-view illustration of a mobile device, according to example embodiments.

FIG. 5A is a cut-away illustration (e.g., as viewed from a plane perpendicular to the x-axis, as illustrated) of a mobile device 500, according to example embodiments. The mobile device 500 may include a case 212, a display 214, a primary battery 202, a first auxiliary battery 502, a second auxiliary battery 504, a third auxiliary battery 506, and an interconnect 512. FIG. 5B is a bottom-view (e.g., view from a plane perpendicular to the z-axis, as illustrated) illustration of the mobile device 500, according to example embodiments.

Like the mobile device 400 illustrated in FIGS. 4A and 4B, the mobile device 500 includes multiple auxiliary batteries. However, unlike the mobile device 400 of FIGS. 4A and 4B, the auxiliary batteries 502/504/506 are not coplanar with one another. As illustrated in FIG. 5B, the auxiliary batteries 502/504/506 may be stacked on top of one another (e.g., along the x-axis). For example, a first surface (e.g., a bottom surface) of the first auxiliary battery 502 may be positioned along a first surface (e.g., a top surface) of the primary battery 202, a first surface (e.g., a bottom surface) of the second auxiliary battery 504 may be positioned along a second surface (e.g., a top surface) of the first auxiliary battery 502, and a first surface (e.g., a bottom surface) of the third auxiliary battery 506 may be positioned along a second surface (e.g., a top surface) of the second auxiliary battery 504. As illustrated in FIG. 5B, the auxiliary batteries 502/504/506 may each have the same thickness (e.g., dimensionality in the x-direction) as one another. However, in alternate embodiments, the auxiliary batteries may have different thicknesses (e.g., an auxiliary battery that is in a layer of the auxiliary battery stack where an interconnect is routed may be thicker or thinner than the other auxiliary batteries in the stack).

Further, one or more of the auxiliary batteries 502/504/506 may be shaped or sized so as to accommodate one or more interconnects within the mobile device 500. For example, as illustrated in FIG. 5B, the second auxiliary battery 504 (e.g., the middle auxiliary battery in the stack of auxiliary batteries) may be smaller in width (e.g., along the y-direction, as illustrated) than the first auxiliary battery 502 and the third auxiliary battery 506 so as to provide space along the second surface of the first auxiliary battery 502 for the interconnect 512 to run. As with the interconnects described above, the interconnect 512 in the mobile device 500 of FIG. 5B may be routed around a periphery of one or more of the auxiliary batteries 502/504/506 (e.g., along the periphery of the second auxiliary battery 504). In some embodiments, one or more interconnects may include segments that have vertical dimensionality (e.g., run along the x-axis illustrated in FIG. 5B). As such, in some embodiments, multiple auxiliary batteries within an auxiliary battery stack may be shaped and/or sized along multiple dimensions to accommodate the one or more interconnects.

It is understood that FIGS. 5A and 5B are provided for illustrative purposes only. While the mobile device 500 includes three auxiliary batteries 502/504/506, other embodiments may include a mobile device that includes any number of auxiliary batteries (e.g., one, two, four, five, six, seven, eight, nine, ten, etc.) arranged in any number of possible arrangements relative to one another and the primary battery within the mobile device. In still other embodiments, some mobile devices may include more than one primary battery.

III. Example Processes

Figure 6:
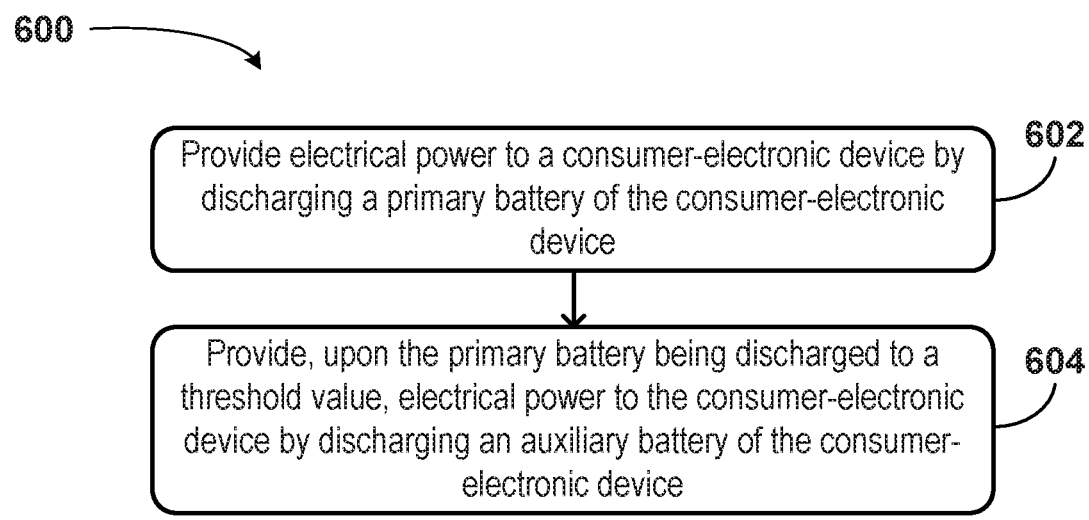
FIG. 6 is a flow cart illustrating a method, according to example embodiments.

FIG. 6 is a flow chart illustrating a method 600. The method 600 may be performed by the mobile device 200 illustrated in FIGS. 2A-2C, for example. The method 600 may be performed to supply electrical power to one or more components of the mobile device 200 using the primary battery 202 until the primary battery 202 is sufficiently discharged and then proceed to supply electrical power to one or more components of the mobile device 200 using the auxiliary battery 204.

At block 602, the method 600 may include providing electrical power to a consumer-electronic device by discharging a primary battery of the consumer-electronic device.

At block 604, the method 600 may include providing, upon the primary battery being discharged to a threshold value, electrical power to the consumer-electronic device by discharging an auxiliary battery of the consumer-electronic device. A first surface of the auxiliary battery is positioned along a first surface of the primary battery. The auxiliary battery is a thin-film battery. The auxiliary battery only occupies a portion of the first surface of the primary battery.

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A device comprising:
   a primary battery;
   an auxiliary battery configured to supply auxiliary electrical power,
   wherein a first surface of the auxiliary battery is positioned along a first surface of the primary battery,
   wherein the auxiliary battery is a thin-film battery, and
   wherein the first surface of the auxiliary battery has a smaller area than the first surface of the primary battery; and
   an interconnect that connects two or more components of the device,
   wherein the interconnect is positioned along the first surface of the primary battery adjacent to the auxiliary battery,
   wherein the interconnect is routed around a periphery of the auxiliary battery, and
   wherein the interconnect is coplanar with the auxiliary battery.

2. The device of claim 1, wherein the primary battery and the auxiliary battery are electrically connected in parallel with one another.

3. The device of claim 1, wherein the auxiliary battery is configured to supply the auxiliary electrical power once the primary battery is discharged to a threshold value by engaging a switch that alternates from the primary battery to the auxiliary battery.

4. The device of claim 1, wherein the primary battery has a capacity between 2,500 mAh and 3,500 mAh.

5. The device of claim 1, wherein the auxiliary battery has a capacity between 50 mAh and 200 mAh.

6. The device of claim 1, wherein a thickness of the auxiliary battery is between 0.25 mm and 0.50 mm.

7. The device of claim 1, wherein the auxiliary battery is flexible.

8. The device of claim 1, wherein the primary battery is arranged in a flattened jellyroll conformation.

9. The device of claim 1, wherein the primary battery is arranged in a pouch conformation.

10. The device of claim 1, further comprising an additional auxiliary battery configured to supply additional auxiliary electrical power.

11. The device of claim 10, wherein a first surface of the additional auxiliary battery is positioned along a second surface of the auxiliary battery.

12. The device of claim 10,
    wherein a first surface of the additional auxiliary battery is positioned along the first surface of the primary battery, and
    wherein the first surface of the additional auxiliary battery is coplanar with the first surface of the auxiliary battery.

13. The device of claim 10, wherein the additional auxiliary battery has a different shape or capacity than the auxiliary battery.

14. The device of claim 10, wherein the additional auxiliary battery has a different thickness than the auxiliary battery.

15. A consumer-electronic device comprising:
    a primary battery;
    an auxiliary battery configured to supply auxiliary electrical power,
    wherein a first surface of the auxiliary battery is positioned along a first surface of the primary battery, and
    wherein the auxiliary battery is a thin-film battery; and
    an interconnect that connects two or more components of the consumer-electronic device,
    wherein the interconnect is positioned along the first surface of the primary battery adjacent to the auxiliary battery,
    wherein the interconnect is routed around a periphery of the auxiliary battery, and
    wherein the interconnect is coplanar with the auxiliary battery.

16. The consumer-electronic device of claim 15, wherein the auxiliary battery is shaped so as to accommodate the interconnect or one or more other components positioned adjacent to the auxiliary battery along the first surface of the primary battery.

17. The consumer-electronic device of claim 15, wherein the auxiliary battery is shaped so as to conform with a shape of a case of the consumer-electronic device.

18. The consumer-electronic device of claim 15, wherein the auxiliary battery has a different shape than the primary battery.

19. A method comprising:
providing electrical power to a consumer-electronic device by discharging a primary battery of the consumer-electronic device; and
providing, upon the primary battery being discharged to a threshold value, electrical power to the consumer-electronic device by discharging an auxiliary battery of the consumer-electronic device,
wherein a first surface of the auxiliary battery is positioned along a first surface of the primary battery,
wherein the auxiliary battery is a thin-film battery,
wherein the consumer-electronic device comprises an interconnect that connects two or more components of the consumer-electronic device,
wherein the interconnect is positioned along the first surface of the primary battery adjacent to the auxiliary battery,
wherein the interconnect is routed around a periphery of the auxiliary battery, and
wherein the interconnect is coplanar with the auxiliary battery.

20. The consumer-electronic device of claim 15, wherein the interconnect is between a first non-battery component of the consumer-electronic device and a second non-battery component of the consumer-electronic device.

* * * * *